US008510793B2

(12) United States Patent
De Lutiis et al.

(10) Patent No.: US 8,510,793 B2
(45) Date of Patent: Aug. 13, 2013

(54) ENHANCING ENUM SECURITY

(75) Inventors: Paolo De Lutiis, Turin (IT); Francesco Silletta, Turin (IT)

(73) Assignee: Telecom Italia S.p.A., Milan (IT)

( * ) Notice: Subject to any disclaimer, the term of this patent is extended or adjusted under 35 U.S.C. 154(b) by 389 days.

(21) Appl. No.: 12/745,608

(22) Filed: Oct. 5, 2010

(65) Prior Publication Data

US 2011/0016145 A1   Jan. 20, 2011

(51) Int. Cl.
*G06F 7/04* (2006.01)
(52) U.S. Cl.
USPC ............................. 726/1; 726/27; 713/167
(58) Field of Classification Search
None
See application file for complete search history.

(56) References Cited

U.S. PATENT DOCUMENTS

| | | | |
|---|---|---|---|
| 6,968,050 | B1 | 11/2005 | Pershan et al. |
| 8,130,425 | B2 * | 3/2012 | Jackson ........................ 358/476 |
| 2004/0230792 | A1 | 11/2004 | McCarty |
| 2006/0248586 | A1 * | 11/2006 | Delaney et al. ................. 726/22 |
| 2007/0104184 | A1 * | 5/2007 | Ku et al. ........................ 370/352 |

OTHER PUBLICATIONS

International Search Report and Written Opinion Sep. 16, 2008, PCT/EP2007/063081.
R. Shockey et al., "Privacy and Security Considerations in ENUM", draft-ietf-enum-privacy-security-01.txt (work in progress), Jul. 2003.
J. Peterson, "Enumservice Registration for Presence Service", draft-ietf-enum-pres-01 (work in progress), May 20, 2004.
ENUM Administration in Europe, Technical Specification, ETSI TS 102 051 V1.1.1 (Jul. 2002), pp. 1-45.
OASIS, Advancing Open Standards for the Information Society, https://www.oasis-open.org, pp. 1-2.
OASIS, Advancing Open Standards for the Information Society, OASIS eXtensible Access Control Markup Language (XAMCL) TC, https://www.oasis-open.org/committees/tc_home.php?wg_abbrev=xacml, pp. 1-10.
Dierks and Allen, "The TLS Protocol, Version 1.0," Network Working Group, Jan. 1999, www.ietf.org/rfc/rfc2246.txt, pp. 1-79.
Kent and Atkinson, "Security Architecture for the Internet Protocol," Network Working Group, Nov. 1998, www.ietf.org/rfc/rfc2401.txt, pp. 1-65.
Rosenberg et al., "SIP: Session Initiation Protocol," Network Working Group, Jun. 2002, www.ietf.org/rf c/rfc3261.txt, pp. 1-265.

(Continued)

*Primary Examiner* — Kaveh Abrishamkar
(74) *Attorney, Agent, or Firm* — Banner & Witcoff, Ltd.

(57) ABSTRACT

A method of providing telecommunication services includes generating fictitious contact information univocally associated with a telephone number assigned to a subscriber; and storing the fictitious contact information in a database, like an ENUM database. Responsive to a request, received from a requester, of a contact information corresponding to the telephone number and adapted to allow contacting over the Internet the subscriber assignee of the telephone number, the method includes having the database providing the fictitious contact information; and conditioning a resolution of the fictitious contact information for the provisioning of the contact information to the satisfaction of at least one security rule adapted to assess properties of at least one among the requester and the request. In a case that the request from the requester satisfies the at least one security rule, the method resolves the fictitious contact information and provides the requester with the contact information.

19 Claims, 8 Drawing Sheets

(56) References Cited

OTHER PUBLICATIONS

Faltstrom and Mealling, "The E.164 to Uniform Resource Identifiers (URI) Dynamic Delegation Discovery System (DDDS) Application (ENUM)," Network Working Group, Apr. 2004, tools.ietf.org/html/rfc3761, pp. 1-36.

Zeilenga, "Language Tags and Ranges in the Lightweight Directory Access Protocol (LDAP)," Network Working Group, Jul. 2004, tools.ietf.org/html/rfc3866, pp. 1-30.

Schulzrinne, "The tel URI for Telephone Numbers," Network Working Group, Dec. 2004, www.ietf.org/rfc/rfc3966.txt, pp. 1-17.

Arends et al., "DNS Security Introduction and Requirements," Network Working Group, Mar. 2005, www.ietf.org/rfc/rfc4033.txt, pp. 1-21.

Kambourakis et al., "Security and Privacy issues towards ENUM protocol," 2005 IEEE International Symposium on Signal Processing and Information Technology, pp. 478-483.

* cited by examiner

ENHANCING ENUM SECURITY

CROSS REFERENCE TO RELATED APPLICATIONS

This application is a U.S. national stage of prior international application PCT/EP2007/063081, filed Nov. 30, 2007, which was published Under PCT Article 21(2) as WO 2009/068111 A1 on Jun. 4, 2009, the entire contents of which are incorporated herein by reference.

BACKGROUND OF THE INVENTION

1. Field of the Invention

The present invention generally relates to communication systems. In particular, the present invention pertains to the enhancement of the security of ENUM (tElephone NUmber Mapping).

2. Description of the Related Art

Nowadays, telephone networks are beginning to move from the old Public Switched Telephone Network (PSTN) towards IP (Internet Protocol) based telephone networks.

The technological platform switch raises new challenges. One of these is for example how to offer Internet-based services, like Voice over Internet Protocol (VoIP) telephone services, in a way that, from a customer acceptance perspective, does not entail changes to the way phone calls are traditionally made; indeed, the way telephones are normally used has become so commonplace that changes would not be welcome by people.

Therefore, techniques are needed for locating called party telephones on the Internet using simply the traditional telephone number entered by a user when placing a call, irrespective of the fact that it will be treated as a VoIP call.

One approach to address these problems is represented by ENUM.

ENUM is the name of a protocol that allows the convergence between the international standard E.164 for telephone numbering, sanctioned by the International Telecommunication Union (ITU), and IP-based networks like the Internet. ENUM achieves this convergence by using a technique based on the Domain Name System (DNS) of the Internet. As known, the DNS is an essential component of contemporary Internet, that associates various kinds of information with so-called "domain names", and serves as the "phone book" for the Internet, by translating human-readable computer hostnames, e.g. Web sites addresses, into corresponding IP addresses that networking equipment needs for delivering information. The DNS allows user computers to find website servers over the Internet using easy-to-remember website addresses instead of complicated, numerical Internet addresses.

The details of ENUM are described in the Internet Engineering Task Force (IETF) document RFC 3761, which is the IETF approved protocol document discussing the use of DNS for the storage of telephone numbers and the available services connected to a telephone number.

Using E.164-compliant telephone numbers and the DNS to implement ENUM is appropriate, because on one side E.164 is a standard for telephone numbers that is accepted and used throughout the world, and, on the other side, the DNS includes the ability to correlate alphanumeric information with IP addresses. E.164 numbers, like website names, remain relatively static in time, requiring relatively infrequent updates (which are limited to cases where for example individual service subscribers change their telephone number).

An E.164-compliant telephone number typically includes a country code, an area or city code, and a phone number. The ITU assigns univocal country codes to sovereign nations, e.g., the United States of America have the country code "1", Italy has the country code "39". Area or city codes and phone numbers are administered by the sovereign nations through local telecommunications regulatory agencies.

For example, a fully qualified E.164 number for the hypothetical telephone number 555-1234 in Washington, D.C. (area code 202) in the United States would be +1-202-555-1234. The symbol "+" indicates that the number is a fully qualified E.164 number.

ENUM addresses the challenges discussed above regarding VoIP and other services, while providing telephone customers with several benefits. ENUM enables wired, mobile, convergent telecom network operators, ISPs (Internet Service Providers), OLOs (Other Licensed Operators), virtual mobile or fixed telephony operators to offer a wide range of IP-based services for communicating with another person when a user knows only a telephone number or has only access to a simple telephone keypad. The user can for example access these IP-based services and resources using Internet-aware (VOIP) telephones, which are for example ordinary telephones connected to Internet gateways or proxy servers, and/or other devices coupled to the Internet where the input capabilities are limited to numeric digits. For instance, users, by subscribing to a specific service offered by, e.g., an ISP or telecom operator, may specify in the ENUM system (particularly, in an implementation thereof called "Global ENUM", as discussed in the following) preferences for receiving incoming communications; this grants the user great control over communications. For example, a user can set up voice mail preferences or can input a destination phone number in a call forwarding service.

There are many potential applications of ENUM. However, the main applications for ENUM have up to now centered on two areas: VoIP and Voice Protocol for Internet Mail (VPIM). One goal of the VoIP industry is to make a phone call over the Internet as easy to make as a plain old PSTN phone call and with the same level of quality. If an average telephone customer were to make a telephone call using, e.g., an Internet-enabled phone to another Internet-enabled phone, all of the steps in between should remain transparent to the user. To the calling party and the called party, this phone call should appear the same as a call made over the PSTN.

Since ENUM can offer many different kinds of services, ENUM has a wide range of potential customers, including individual residential telephone subscribers, corporations, government agencies, military, and hosts of other non-individual users. A list of the services that a subscriber user is entitled to is stored in the ENUM database and may be accessed in response to the entry of a code through the telephone keypad. When subscribers wish to use a specific service, they can identify the ENUM service that they wish to use, e.g., by entering the associated code on the telephone keypad.

Essentially, the ENUM protocol as defined in the IETF document RFC 3761 works in the following manner. Once a telephone number is entered, it is translated into a domain name; the translation of the entered phone number into a domain name involves first translating the entered number into a fully qualified E.164 number, by adding the city—or area—and country code; then, the order of the digits of the fully qualified E.164 number is reversed, and dots are placed between each digit; the domain "e164.arpa" is finally appended to the end.

ENUM then issues a DNS query on the resulting domain name. Once the authoritative domain name server is found, ENUM retrieves the relevant NAPTR (Naming Authority PoinTeR) resource records from an ENUM database, and performs according to the user's registered services for that telephone number.

ENUM can have various implementations; two possible ENUM implementations are referred to as "Public ENUM" or "Global ENUM" and "Carrier ENUM" or "Infrastructure ENUM".

Global ENUM is a global, public directory-like database, with subscriber opt-in capabilities and delegation at the country code level in the e164.arpa domain. Global ENUM provides routing information (IP addresses related to E.164 numbers managed by a given operator) to other operators and service providers. In the Global ENUM, an end user is enabled to "opt-in" by providing and reading the routing information. In particular, the Global ENUM defines the domain "e164.arpa" that can be used as the basis for storing E.164 numbers in the DNS (according to the IETF document RFC 3761). The administration of Global ENUM is a national or regional matter, and is managed by telecom regulatory agencies of the different countries. Being public and open to everyone, the Global ENUM may be affected by spamming issues and other forms of fraudulent behavior, as discussed later on.

On the contrary, the Infrastructure ENUM is an ENUM implementation that may be used only within a restricted number of selected, trusted operators. The Infrastructure ENUM is not accessible by end users, it is intended for internal use only among the circle of trust operators. This ensures service security and subscriber privacy. Infrastructure ENUM facilitates finding users and their related services for routing purposes within the operator networks, to find the border elements connected to other operators or gateways to the PSTN network, to hide the users and the infrastructure behind border elements and to give outside operators access to only these border elements. A shared Infrastructure ENUM is intended to be used by operators to reach the border elements of trusted networks; it is not intended to be used directly by subscribers or end-users of untrusted networks. For this reason, the public "e164.arpa" domain name space is not appropriate for the Infrastructure ENUM services, and private domain names should be adopted.

Despite its undoubted advantages, the potential risks of ENUM have already been recognized. For example, in the document ETSI TS 102 051 entitled "ENUM Administration in Europe" it is forecasted that ENUM provides a significant risk for unscrupulous use of the information contained in its NAPTR records. Any communication attempt to an E.164 number for which ENUM records exist will enable the requesting ENUM client application to access information on all of the service specific communication identifiers (telephone numbers, email addresses, instant messaging addresses, etc.) contained in the NAPTR record of a certain subscriber. This information could be used to determine the identity of the person associated with a randomly entered E.164 number (e.g. by looking at the name in his/her email address, or by looking at any other entry in his/her NAPTR record that gives a clue to the subscriber name). This potential abuse of ENUM could be used to assist "identity thefts" or to help organizations that wish to build lists of identities for the propagation of "spam" communications across a wide range of different communications services (e.g. people who nowadays contact other people by working through lists of telephone numbers could, misusing ENUM, also generate lists of email addresses and instant messaging identifiers associated with those numbers). Information contained in NAPTR records may reveal the types of communications applications and services that are used by an ENUM end user, and potentially also the providers of these applications and services. This information could be used by third parties for commercial purposes, for example, to make offers to ENUM end user regarding applications and services that compete with those used by the subscriber, or to develop and sell market profiles showing the communications applications and services used by ENUM end users.

ENUM, like any system that maps multiple services to a single identifier (the subscriber's E.164 number), can be vulnerable to multi-service Denial of Service (DoS) attacks. For example, anyone mounting a "flood attack" on the DNS NAPTR records could prevent the retrieval of any communication addresses from the attacked NAPTR record. Such an attack would make it impossible for anyone querying the NAPTR record to get a response to their query. The result of such an attack could be that nobody would be able to communicate with that ENUM end user using any of the possible communication services associated therewith, thus completely disabling the subscriber's incoming communications (possibly, with the only exception of phone calls over a PSTN).

Additional risks may arise from private implementations of ENUM that suffer from poor supervision or controls.

For the integrity and security aspects, two of the main threats are passing off and hijacking.

Passing off is where an entity represents itself as someone or something that it is not, usually to achieve a commercial advantage or for criminal purposes. In the context of ENUM, passing off could occur when an entity provisions in the DNS the E.164 number of someone else (another person or company), inserting its own details in the NAPTR record corresponding to the other person's or company's number. Passing off is regarded as detrimental because it undermines the trust that individuals and organizations should have in communications using ENUM capabilities.

Hijacking is where a provider of communications applications and services is inserted in a communication path without an end user's permission. In the context of ENUM, hijacking could occur when a provider of communications applications or services arranges for end users' E.164 numbers to be provisioned in the DNS without their consent, and when communications using ENUM capabilities for these numbers are redirected via a network, application or service that end users have not chosen. Hijacking is regarded as detrimental because it could allow a provider of communications applications or services to collect transit or other revenues improperly, and contradict an end user's decision regarding the transport of its incoming communications.

Due to the possibility of setting up several, possibly competing private ENUM systems, distinct from the e164.arpa ENUM (like for example e164.com, e164.org or the like), problems of consistency among the data stored in the NAPTR records of the different ENUM systems databases exist.

Both of these risks point to the need for adequate mechanisms to ensure that the request to provision a number in the DNS originates from the rightful assignee of the number.

One possible method could involve authentication by a validation entity. Whatever solution is developed, any effective method is likely to involve some degree of validation. While this method overcomes the problem of "passing off", it may not completely solve the problem of "hijacking", since the Validation Entity could attempt to hijack the number. Similar issues occur in the case of amendment and withdrawal of a number. The challenge is to ensure that the processes meet requirements in order to maintain consistency between ENUM domain names and E.164 numbers, while not imposing an excessive administrative burden on any involved entities.

Additional risks arise due to the potential that bad administration models could allow entities to abuse positions of significant market power. The ENUM database has a three-level hierarchic structure: the highest hierarchic level is called "Tier 0 Registry" or, simply, "Tier 0", and is reachable by means of a Top Level Domain (TLD) DNS name (like "e164.arpa"); the hierarchic level below the Tier 0 is called "Tier 1 Registry" or "Tier 1"; several Tiers 1 exist, each one associated with a respective country code; the bottom hierarchic level is called "Tier 2 Registry" or "Tier 2", and corresponds to a respective telephone number. An abuse of market power position mainly arises around the Tier 1. Normally, the management of the Tier 1 is under the responsibility of the country to which the country code of the Tier 1 corresponds. However, should a country delegate responsibility of managing its Tier 1 without adequate controls, the appointed Tier 1 manager could potentially abuse of its unique position, for example by charging a disproportionate fee for entering E.164 numbers into its database; on the other side, appointing two or more competing subjects the task of managing the Tier 1 of a certain country leads to many additional complications, including complex and difficult inter-working requirements.

It is also possible that control of the domain in which ENUM is hosted by managers of a single country or region provides that country or region with undue influence over the operations of converged Internet-telephony networks. Similarly, if the location of DNS servers upon which the ENUM mechanism depends lies predominantly in a single country or region, this may result in communications within Europe or between Europe and other regions being unduly reliant on infrastructures outside Europe.

There is also the possibility to register entire blocks of numbers into ENUM. For this reason, it is important to ensure that those numbers are under the control of the owner with the possibility to change the policy on when the resolution should be done and by who is authorized or not.

U.S. Pat. No. 6,968,050 discloses a system that provides ENUM security for authenticating and authorizing people to register information corresponding to a telephone number in the context of AIN (Advanced Intelligent Network) based methods and apparatus, e.g., in an ENUM database. The methods may be used to authenticate a party seeking to register telephone number related information with ENUM. A trigger is set on an ENUM registration line. Calls to the ENUM registration line activate the trigger causing LIDB (Line Information DataBase) information corresponding to the calling party number to be retrieved. The retrieved information, e.g., name, address and/or phone number, is supplied to an ENUM registration service which returns a password to be used when updating or supplying ENUM registration information corresponding to the phone number from which the registration call is placed at some future time, e.g., via the Internet. Assigned ENUM passwords can be obtained when forgotten by placing a call to the registration service from the registered or associated phone number.

The IETF RFC 4033 document entitled "DNS Security Introduction and Requirements" sets forth an extension to the DNS that provides data integrity and authentication to security aware resolvers and applications through the use of cryptographic digital signatures. These digital signatures are included in secured zones as resource records. Security can also be provided through non-security aware DNS servers in some cases. The extensions provide for the storage of authenticated public keys in the DNS. This storage of keys can support general public key distribution services as well as DNS security. The stored keys enable security aware resolvers to learn the authenticating key of zones in addition to those for which they are initially configured. Keys associated with DNS names can be retrieved to support other protocols. In addition, the security extensions provide for the optional authentication of DNS protocol transactions and requests.

The paper by G. Kambourakis et al entitled "Security and privacy issues towards ENUM protocol", published in the proceedings of the 2005 IEEE International Symposium on Signal Processing and Information Technology held on 18-21 Dec. 2005 in Samos (Greece) (pages 478-483), describes the security issues relating to the usage of ENUM technology and provides a list of potential guidelines for ensuring those issues.

SUMMARY OF THE INVENTION

From the discussion above, it appears that the ENUM system, as currently implemented, may be exposed to potential security threats. In fact the ENUM system, when the information are globally available or not properly controlled, can be subjected to spammer (that generate unsolicited communication reusing the information about the reach ability of the target of the attack), to hackers (that uses the information contained in the ENUM system to carry on specifics VoIP attach) or to misuse by untrusted operators (that may for example use the information to conduct marketing analysis without any control from the owner of the information). The information related to the routing and reach ability of the customer/services that were protected by a PSTN/ISDN network seems to be lost or not easily managed with a potential loss of business for operator and security for customer.

Many of the problems derive from the fact that ENUM is a packet network service (i.e., based on the Internet and the TCP/IP protocol suite), relying on DNS protocol and infrastructure, that has been designed without any needs of control of information processed.

In relation to the solution disclosed in U.S. Pat. No. 6,968, 050, the Applicant believes that it has the following drawbacks:

- it is oriented to authenticate and authorize the modification of the information stored into the ENUM system (i.e. the association between the telephone number and the URI—Uniform Resource Identifier);
- It is bound to the old-fashion PSTN and IN (Intelligent Network) system, and it is based on the PSTN CLI (Calling Line Identity, the telephone number of the caller) authentication mechanism.

The solution disclosed in U.S. Pat. No. 6,968,050 proposes a self-provisioning mechanism of information to an ENUM server, starting directly from data generated by the PSTN subscriber who wishes to be reachable by VoIP calls. The solution is not suitable to protect the information already published in the ENUM system, and does not address the various problems arising form the Internet and the packet networks connections.

Concerning the IETF RFC 4033 document, the Applicant believes that the DNSsec solution has the following drawbacks:

- it is focused on the integrity and authenticity of the data contained in the DNS database in order to face some specific attack (i.e., DNS poisoning);
- it cannot be used/adapted to protect the privacy of user data and the exchange of information confidentiality within ENUM communications;

when ENUM is based on the DNSsec mechanism, it still does not protect the operator business (for instance, some protected information, once available on the ENUM system, are also available to other parties which cannot be controlled by the owner).

On the other hand, the paper by G. Kambourakis et al provides a general overview useful for the identification of the shortcomings of the ENUM infrastructure, but it does not provide any concrete solution for the identified issues, beyond the DNSec.

The Applicant has tackled the problem of making ENUM services more secure and capable of guaranteeing the privacy of users.

The Applicant has found that a solution to this problem can be attained by hiding the user's contact information that is normally stored in the ENUM system databases (i.e., the SIP URI) by using a fictitious user's contact information, which are adapted to be stored in ENUM databases but per se cannot be used to contact the user, and adding a security policy management platform to the ENUM system in order to condition the resolution of the fictitious contact information, for revealing the true user's contact information, to the satisfaction of predetermined rules.

An aspect of the present invention relates to a method of providing telecommunication services, comprising:
  generating a fictitious contact information univocally associated with a telephone number assigned to a subscriber;
  storing the fictitious contact information in a database;
  responsive to a request, received from a requester, of a contact information corresponding to said telephone number and adapted to allow contacting over the Internet the subscriber assignee of said telephone number, having the database providing said fictitious contact information;
  conditioning a resolution of the fictitious contact information for the provisioning of the contact information to the satisfaction of at least one security rule adapted to assess properties of at least one among said requester and said request, and
  in case the request from the requester satisfies said at least one security rule, resolving the fictitious contact information and providing to the requester the contact information.

In particular, said database may be an ENUM database.

Said contact information may include a SIP URI univocally identifying said subscriber.

Said fictitious contact information may include a fictitious URI univocally associated with the SIP URI of said subscriber. In particular, said fictitious URI may include a randomly-generated information. Even more particularly, said fictitious URI may include a domain name univocally identifying a resolver system adapted to resolve the fictitious contact information conditioned to the satisfaction of the at least one security rule.

Said at least one security rule may define one or more among: telephony network operators entitled to resolve the fictitious contact information, requesters entitled to resolve the fictitious contact information, types of connectivity services the requester is entitled to exploit for contacting over the Internet the subscriber assignee of said telephone number, indications on dates and times when requesters are allowed to contact the subscriber assignee of said telephone number.

The method may further comprise enabling either the subscriber assignee of the telephone number or a telephony operator to which the subscriber has subscribed define said at least one security rule.

Said generating a fictitious contact information univocally associated with the telephone number assigned to the subscriber may preferably include generating a new fictitious information after said resolving the fictitious contact information.

Another aspect of the present invention relates to a system for providing telecommunication services, comprising:
  a generator adapted to generate fictitious contact information univocally associated with a telephone number assigned to a subscriber, and to cause the fictitious contact information to be stored in a database as a contact information of said subscriber;
  a security policy rules enforcer adapted to:
  receive from a requester a request of resolution of said fictitious contact information for obtaining a contact information corresponding to said telephone number, said contact information being adapted to allow contacting over the Internet of a subscriber having said telephone number; and to
  condition a resolution of the fictitious contact information and the provision to the requester of the contact information to at least one security rule adapted to assess properties of at least one among said requester and said request.

The database may in particular be an ENUM database.

Said contact information may include a SIP URI univocally identifying said subscriber.

Said fictitious contact information may include a fictitious URI univocally associated with the SIP URI of said subscriber. In particular, said fictitious URI may include randomly-generated information. Even more particularly, said fictitious URI may include a domain name univocally identifying the security policy rules enforcer.

Said at least one security rule may define one or more among: telephony operators entitled to resolve the fictitious contact information, requesters entitled to resolve the fictitious contact information, types of connectivity services the requester is entitled to exploit for contacting over the Internet the subscriber assignee of said telephone number, indications on dates and times when requesters are allowed to contact the subscriber assignee of said telephone number.

Said at least one security rule may be in XML language.

The system may further, comprise a security rule manager adapted to allow either the subscriber assignee of the telephone number or a telephony operator to which the subscribed has subscribed define said at least one security rule.

Preferably, a new fictitious contact information univocally associated with the telephone number assigned to the subscriber may be generated after said resolving the fictitious contact information.

BRIEF DESCRIPTION OF THE DRAWINGS

The features and advantages of the present invention will be best understood by reading the following detailed description of some embodiments thereof, provided merely by way of non-limitative examples, description that will be carried out making reference to the attached drawings, wherein.

DETAILED DESCRIPTION OF EMBODIMENTS OF THE INVENTION

Figure 1:
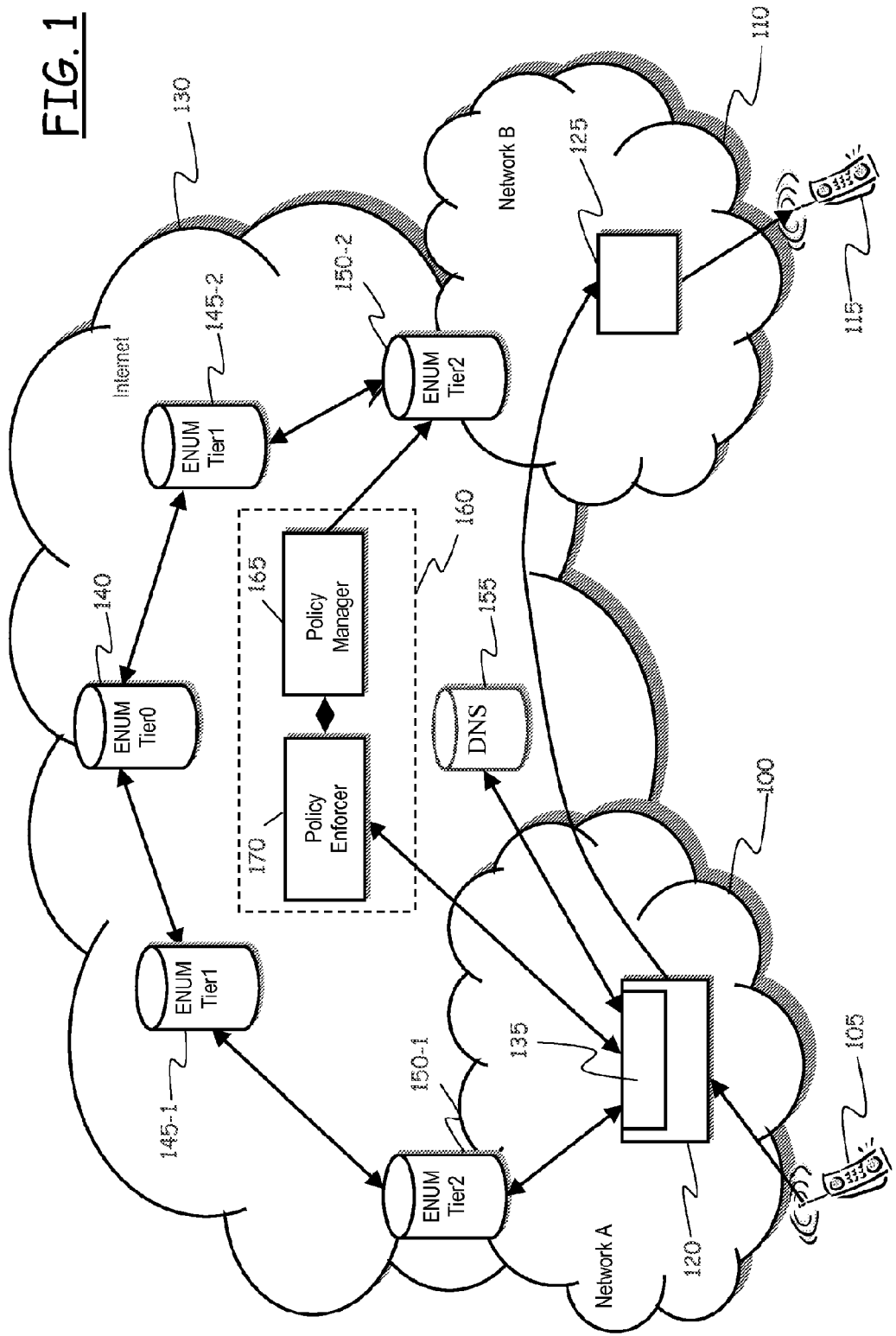
FIG. 1 schematically shows a scenario of application of an embodiment of the present invention.

Referring to FIG. 1, a scenario of application of an embodiment of the present invention is schematically shown.

In the drawing, reference numeral 100 denotes the network of a generic, first telephony operator A ("Network A", as indicated in the drawing); the telephony operator A is for example one of the telephony operators providing telephony services in a certain country of the world, e.g. Italy. The telephony operator A has respective subscribers, a generic one of which is denoted with reference numeral 105. The generic subscriber of the telephony operator A has assigned thereto a respective telephone number.

Reference numeral 110 denotes the network of another generic, second telephony operator B ("Network B", as indicated in the drawing); the telephony operator B is, in the example herein considered, one of the telephony operators providing telephony services in a certain country of the world, different from the country of the telephony operator A, e.g. the United States of America. Reference numeral 115 denotes a generic subscriber of the telephony operator B; the subscriber 115 has assigned thereto a respective telephone number, for example the hypothetical telephone number 202-555-1234, which identifies a subscriber having telephone number 555-1234 in the area of Washington, D.C. (area code 202). It is pointed out that the present invention also applies to cases in which the two telephony operators A and B operate in a same country, or even coincide; in is also pointed out that the present invention is not limited to the case of two telephony operators, and applies irrespective of the number of telephony operators.

Reference numeral 120 in the drawing denotes core network apparatuses of the telephony operator A, including for example switching centrals and call server apparatuses; similarly, reference numeral 125 denotes core network apparatuses of the telephony operator B.

The networks 100 and 110 of the telephony operators A and B are connected to the Internet 130.

The core network apparatuses 120 of the telephony operator A implement an ENUM client functionality 135 adapted to interface the network 100 of the telephony operator A to the ENUM system.

The ENUM system comprises a hierarchical structure of databases, also referred to as the "golden tree", which comprises a top-level ENUM database 140, referred to as Tier 0, located at the top of the hierarchical structure, several databases located at a first sub-level below the Tier 0, referred to as Tier1, like the two databases 145-1 and 145-2 shown in the drawing, and, below each Tier1 database, several bottom-level databases referred to as Tier 2, like the two databases 150-1 and 150-2 shown in the drawing.

The Tier 0 database 140 is assigned and is reachable by means of a top-level ENUM domain name, like "e164.arpa" according to the prescriptions of the IETF document RFC 3761, and stores Internet addresses of the Internet servers hosting the Tier 1 databases. Each of the Tier 1 databases is associated with a respective country code, i.e. with a respective country of the world; in the example herein considered, the Tier 1 database 145-1 is associated with the country code "+39", corresponding to Italy, and the Tier 1 database 145-2 is associated with the country code "+1", corresponding to the United States of America. Each Tier 1 database stores Internet addresses of Internet servers hosting the Tier 2 databases of telephone numbers of the respective country. Each Tier 2 database normally stores NAPTR (Naming Authority PoinTeR) records for individual telephone numbers. In the example herein considered, the Tier 2 database 150-1 is intended to store NAPTR records for telephone numbers of subscribers to the telephony operator A, and the Tier 2 database 150-2 is intended to store NAPTR records for telephone numbers of subscribers to the telephony operator B; a generic NAPTR record for a certain telephone number stores information for the routing of calls placed to that telephone number, and the subscriber's call forwarding/termination preferences.

It is pointed out that the applicability of the present invention is not limited to the public, Global ENUM "e164.arpa", being as well applicable to private ENUM systems.

In the conventional implementation of the ENUM system, the generic NAPTR record in a Tier 2 database contains the URI (Uniform Resource Identifier) assigned to a certain subscriber of a telephony network; the URI is a string of characters, having the syntax defined by the IETF document RFC 3866, which identifies a resource in a network like the Internet. The URI allows locating the subscriber using the services of a DNS (Domain Name Server) or system of DNSs 155. In particular, the URIs stored in the NAPTR records of the ENUM system are "TEL URIs", whose format is specified in the IETF document RFC 3966 (entitled "The tel URI for Telephone Numbers"); a generic TEL URI describes resources identified by telephone numbers.

As discussed in the introduction of the present description, the conventional ENUM system implementation is exposed to several risks. The Applicant has observed that many of the risks to which the ENUM system is exposed derive from the fact that the TEL URIs are freely accessible.

According to an embodiment of the present invention, in order to overcome these problems and make the ENUM system more secure, a security policy platform is provided for in connection with the ENUM system.

Figure 2:
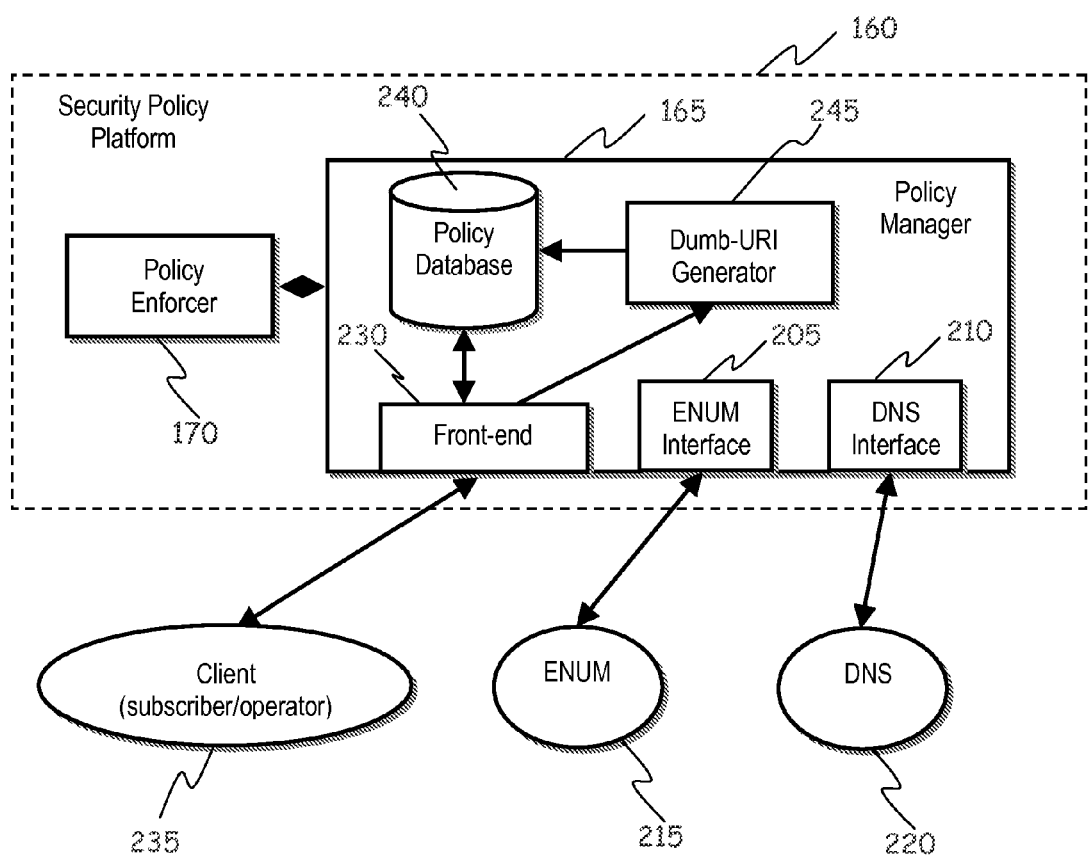
FIG. 2 depicts, still schematically but in greater detail, a security platform for securing ENUM services, according to an embodiment of the present invention.

In particular, according to an embodiment of the present invention, the security policy platform, which in FIG. 1 is globally identified by reference numeral 160 and is depicted in greater detail in FIG. 2, essentially comprises a security Policy Profiling System (PPS) that allows the definition and management of security policy rules.

The security policy rules are rules that define the expected behavior of the system when access to the information stored in the ENUM system is attempted, and in particular they define which requests should be allowed and which instead should be denied in terms of information that can be accessed (for example discriminating among who can retrieve the information and when the information can be retrieved).

The PPS according to an embodiment of the present invention comprises a policy management subsystem (policy manager) 165 adapted to allow the definition and registration of security policy rules, and a policy enforcement subsystem (policy enforcer) 170 adapted to enforce the security policy rules defined through and registered in the policy manager 165.

The security policy rules can be defined and registered directly by a security policy platform user, who can be an end user, being a subscriber of a telephony operator and having been assigned a telephone number, or a telephony operator wishing to set up, in respect of one or more, possibly all of its subscribers, security policy rules for conditioning the access to the ENUM services; for example, referring to FIG. 1, the security policy rules may be defined and registered in the policy manager 165 by the subscriber 115, or by the telephony operator B of the subscriber 115, or by both of them.

The policy manager 165 interacts with the policy enforcer 170.

In particular, the policy manager 165 provides to the policy enforcer 170 the security policy rules to be enforced in respect of specific subscribers, or/and in respect of groups of subscribers (possibly all the subscribers) of a telephony operator; in the example shown in FIG. 1, the security policy rules are rules to be enforced in respect of the subscriber 115, or/and in respect of groups of subscribers (possibly all the subscribers) of the telephony operator B.

The policy manager 165 also interacts, through suitable communication interfaces 205 and 210, with the ENUM system and possibly with the DNS system, which in FIG. 2 are denoted globally as 215 and 220, respectively; the interaction of the policy manager 165 with the ENUM system 215 and with the DNS system 220 is described in detail later, when the operation of the security policy platform 160 is described.

The security policy platform 160 may be accessed by subscribers/telephony operators through a front-end 230, like for example an HTTP (Hyper Text Transfer Protocol) server or a Web server, allowing PPS software clients 235 to interface with the policy manager 165 in order to permit the insertion/modification/withdrawal of security policy rules.

The policy manager 165 may be based on a standard VoIP registrar system, i.e., it can be a SIP—Session Initiation Protocol—registrar, which is a standard element of the SIP-based architecture, as defined in the IETF RFC 3261 document, managing the registration of users. As known to those skilled in the art, the SIP is an application-layer control (signalling) protocol that runs on top of several different transport protocols and is based on the TCP/IP protocol suite, and which can be used for creating, modifying, and terminating sessions with one or more participants. These sessions include Internet (VOIP) telephone calls, multimedia distribution, multimedia conferences. The SIP makes use of elements called proxy servers to help routing requests to the user's current location, authenticate and authorize users for services, implement provider call-routing policies, and provide features to users. The SIP provides a registration function that allows users to upload their current locations for use by proxy servers.

The policy manager 165 includes a database 240 where the security policy rules defined by the clients are stored.

The policy manager 165 also comprises a dumb-URI generator, operable to generate dumb, fictitious URIs that are univocally associated with real SIP URIs, for the purposes of hiding the real SIP URIs, as discussed in greater detail later on.

The operation of the security policy platform according to an embodiment of the present invention is described in detail hereinafter.

Figure 3:
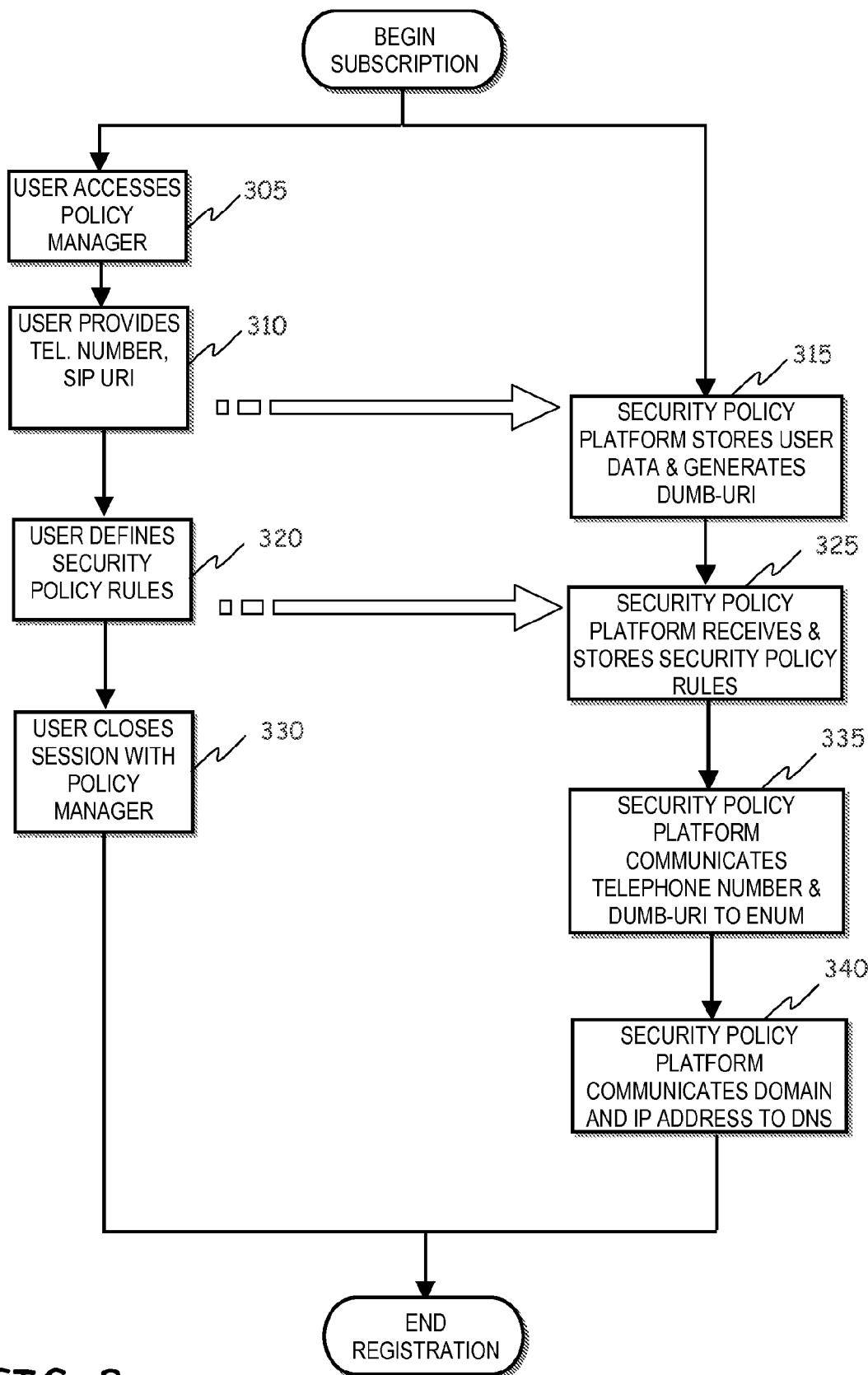
FIG. 3 is a schematic flowchart of a phase of subscription of a telephone number to the security platform, including a security policy definition phase, according to an embodiment of the present invention.

In order for a user, like for example the subscriber 115 of the telephony operator B, or directly the telephony operator B itself, to benefit of the services of the security policy platform 160, a preliminary subscription to the security policy platform is requested. The main steps of a user subscription procedure to the security policy platform are depicted in the schematic flowchart of FIG. 3.

The user (like for example the subscriber 115, or the telephony operator B) accesses (for example, through a Web page of a Web site of the security policy platform) the security policy platform 160, particularly the policy manager 165 (action 305).

The user (the subscriber 115, or the telephony operator B) provides to the policy manager 165 the respective telephone number (for example, the telephone number +1-202-555-1234 of the subscriber 115 in FIG. 1), along with the corresponding SIP URI (for example, the SIP URI of subscriber 115 may be subscriber-X@domain-B.com) and TEL URI. For example, the user can submit these data using the SIP protocol, particularly the SIP REGISTER message, by which, as defined in the IETF RFC 3261 document, registration information is transported. The telephone number can be provided already in the E.164 format, or it can be translated into the E.164 format by the policy manager 165. In the flowchart these actions are globally indicated as action 310.

The policy manager 165 receives and stores the user registration data, for example in the policy database 240; then, the policy manager 165 invokes the dumb-URI generator 245 asking for the generation of a univocal dumb-URI to be associated with the SIP-URI received from the user (action 315).

A possible dumb-URI is a dumb, intrinsically meaningless ASCII string, i.e. a sequence of characters, digits and symbols in ASCII code; any character can be used, exception made for the "@" symbol, which is reserved being normally used as a separator between a user name and an Internet domain name. The dumb ASCII string may be generated by the concatenation of randomly-generated ASCII characters (for example generated by an algorithm or hardware generator adapted to generate random sequences of numbers/characters). An exemplary dumb-URI may be the following: asfjwegoSJDHASDOksdaoq12313asdaqe.

Another possible dumb-URI is the concatenation of a dumb, intrinsically meaningless ASCII string, like in the example above, followed by the symbol "@" followed by an Internet domain name, i.e. it may have the format <dumb-ASCII-string>@<domain>. An exemplary dumb-URI may in this case be the following: fthftydfrtyer456drftddJHJI@domain-C.com. The "domain" univocally identifies a particular security policy platform, for example the "domain" "domain-C" may identify the security policy platform 160. In this way, a system of security policy platforms may be set up, each one identified by a corresponding domain name, with the advantage of achieving a distribution of the burden over more than one security policy platform.

The user then defines the preferred security policy rules (action 320). To this purpose, the user may use a formal language, such as the XML (eXtensible Markup Language), for example the language define by OASIS (Organization for the Advancement of Structured Information Standards, Internet site http://www.oasis-open.org), particularly the XACML language (eXtensible Access Control Markup Language) (details on this language can be found at the Internet address http://www.oasis-open.org/committees/tc_home.php?wg_abbrev=xacml).

An exemplary security policy rule that the user may define is the following:

```
<Rule>
    <NAME> "Time Policy XYZ" </NAME>
    <From>
        <NUMBER> 202-555-1234</NUMBER>
        <INCOMING> "Operator-A" </INCOMING>
    </From>
    <To> * </To>
```

```
    <Service> VoIP, MMS </Service>
    <RANGE DATE> MON-FRI </RANGE DATE>
    <ACTION> Disclose-URI </ACTION>
</Rule>
```

In the above example, the string "Time Policy XYZ" between the tags <NAME>, </NAME> defines the name of the rule (the name can be assigned by the user); the tags <From>, </From> and <To>, </To> delimit a part of the rule where the telephone number of the subscriber to which the security rule is intended to apply, and telephone numbers or ranges of telephone numbers or identifiers of telephony operators can be specified; the tags <Service>, </Service> delimit a part of the rule where services to which the rule is intended to apply can be specified; the tags <RANGE DATE>, </RANGE DATE> delimit a part of the rule where time ranges can be specified; the tags <ACTION>, </ACTION> delimit a part of the rule where one or more actions conditioned to the satisfaction of the rule can be specified.

The above exemplary rule, named "Time Policy XYZ", states that the URI associated with the E.164 number 202-555-1234 can be inquired by (disclosed to) all ENUM clients which are subscribers of the "Operator-A" (the telephony operator A in the example of FIG. 1) and who wish to set up a VoIP call or send an MMS (MultiMedia Messaging Service) message only from Monday to Friday.

Other exemplary security policy rules may define (using a language similar to that used for defining the previous exemplary rule) the following conditions: "Subscriber A is always allowed to resolve the telephone number of Subscriber B", "Subscriber A is allowed to resolve the telephone number of Subscriber B only for MMS services", "Subscribers not in the community of Subscriber B are not allowed to resolve the telephone numbers of Subscriber B", wherein the "community" may be defined as an address book of trusted telephone numbers defined by the subscriber B (e.g., the subscriber 115 in FIG. 1), or a range of telephone numbers that the telephony operator B considers trusted. In the above examples, by "resolve the telephone number" it is intended the actions of deriving, based on the ENUM service and on the DNS, from the telephone number of a called party the respective IP address for reaching the called party over the Internet.

The user may define one or more security policy rules; the user may compile the security policy rule(s) on-line, through the Web site of the security policy platform 160, or off-line, at his/her premises, and then upload the previously compiled rule(s) to the security policy platform 160.

The policy manager 165 receives the security policy rules from the user and stores them into the security policy database 240 (action 325). The security policy rules are univocally associated with the dumb-URI that has previously been generated and assigned to the user.

Once the user has completed the definition of the desired security policy rules, the user closes the session with the policy manager 165 (action 330).

The policy manager 165 then communicates the security policy rules defined by the user to the policy enforcer 170. The policy manager 165 also communicates the telephone number received by the user and the univocally-associated dumb-URI generated for that telephone number to the ENUM system 215 (action 335); the telephone number and the associated, intrinsically meaningless dumb-URI (not the true SIP URI, as in the usual ENUM service implementation) is thus stored in the ENUM databases. In particular, considering the example of FIG. 1, these data are stored in the Tier 2 database 150-2.

Optionally, the policy manager 165 may communicate to the DNS system 220 the domain and IP address of the user that the user's telecommunications terminal or the core network apparatuses of the operator communicated to the security policy manager 165 (action 340). This may be useful in those cases where the user that subscribed to the security policy platform has been assigned a static IP address, that does not dynamically change from an Internet session to another.

The user may access the security policy platform 160 even after having been preliminary subscribed thereto, for example for modifying the security policy rules previously defined, add new rules, delete rules. Every time a change in the security policy rules takes place, the new security policy rules are communicated to the policy enforcer 170.

Each time the user 110 turns on its terminal (like an IP-enabled phone, e.g. a VOIP phone) and connects to the core network apparatuses 110 of the telephony operator B, to connect to the Internet 130, the user terminal is assigned an IP address (for example, in the case of 115 the hypothetic IP address 11.22.33.44). A SIP registration phase takes place (as specified in the IETF RFC 3261 document), by which the user terminal registers to a registrar SIP server (not shown in the drawings because known per se). The user terminal communicates the IP address assigned thereto and the respective SIP URI to the registrar SIP server. At the successful completion of the user terminal registration, the user is regarded as "present" and able to receive incoming calls (being reachable at the assigned IP address). The registrar SIP server communicates the "presence" information of the user to the security policy platform 160. In case the user 110 does not have an Internet-enabled terminal, like a plain old telephone, the SIP registration of the user is performed by the core network apparatuses of the telephony operator B.

Figure 4A:
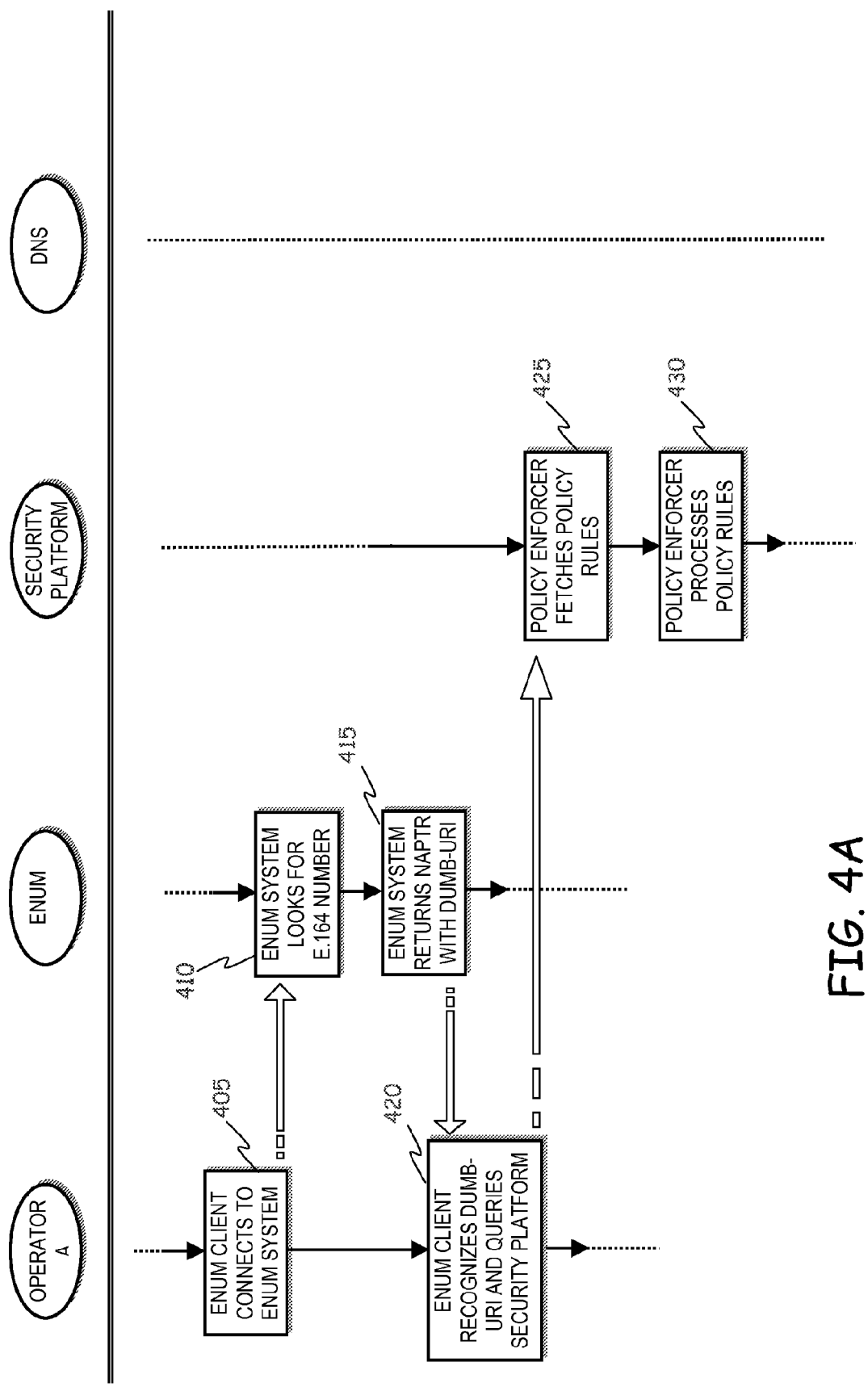
FIGS. 4A and 4B show a schematic flowchart of a security policy enforcement phase, according to an embodiment of the present invention.
Figure 4B:
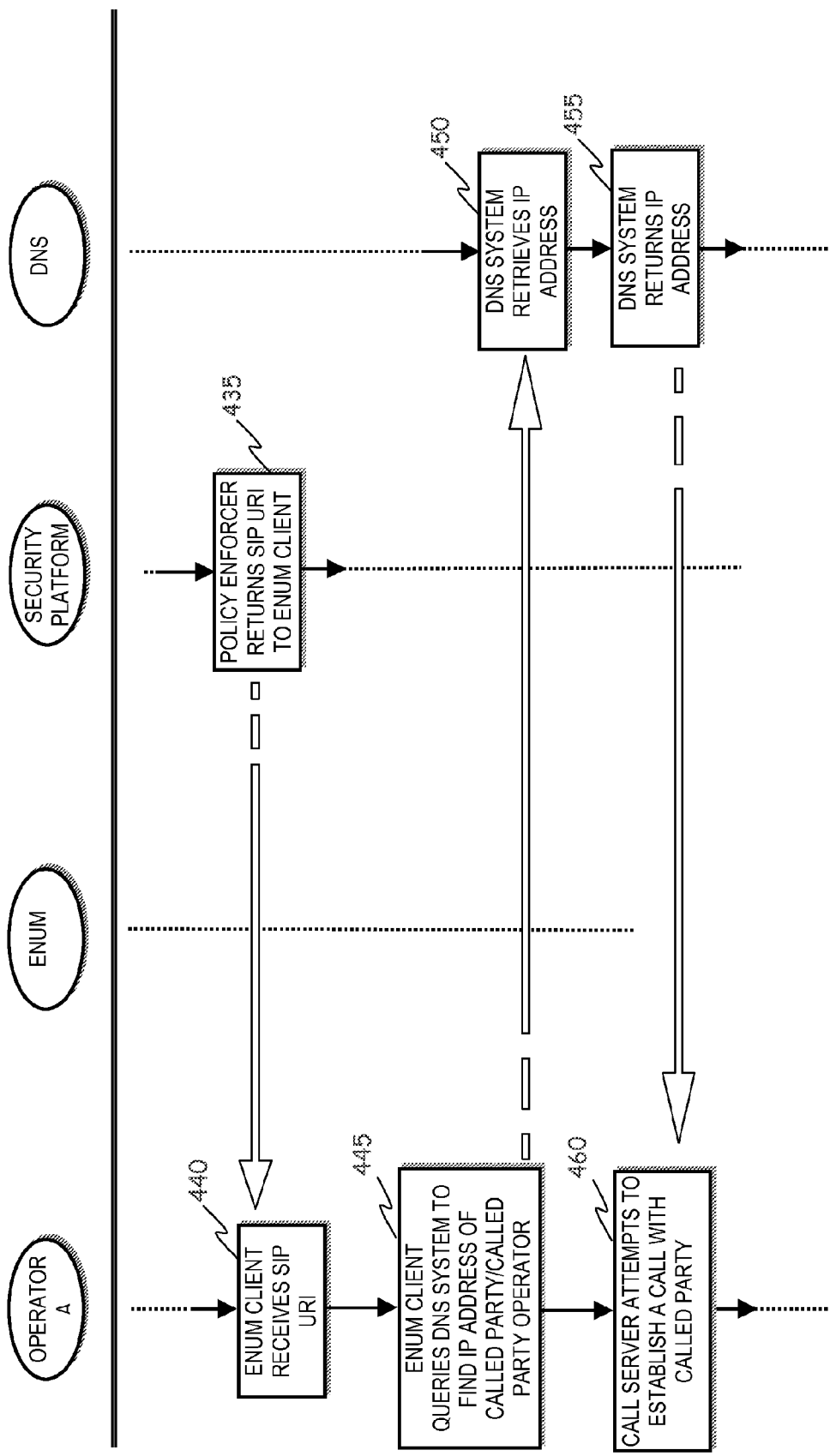

The schematic flowchart of FIGS. 4A and 4B shows the main actions performed by the security policy platform according to an embodiment of the present invention, when someone, like for example the subscriber 105 of the telephony operator A in FIG. 1, tries to reach the subscriber 115 of the telephony operator B through the Internet.

In particular, in the scenario now considered, it is assumed that the subscriber 105 wishes to place a phone call to the subscriber 115 using a plain telephone, i.e. not an Internet-enabled phone like a VoIP telephone.

The subscriber 105 dials as usual on his/her phone the telephone number of the subscriber 115, complete of country code and area code.

When the network apparatuses 120 of the telephony operator A receive from the subscriber 105 the request to establish a connection with the subscriber 115, the network apparatuses 120, particularly the ENUM client functionality 135 contacts the ENUM system 215, providing thereto the E.164 telephone number of the called subscriber (action 405).

The ENUM system 215 looks through its databases searching for the specified E.164 number (action 410). In particular, in the example of FIG. 1, the ENUM golden tree, i.e. the hierarchic structure of databases is climbed up from the Tier 2 database 150-1 to the Tier 0 database 140, and then down to the Tier 2 database 150-2.

The ENUM database 150-2 that stores the NAPTR record for the searched E.164 number provides the found NAPTR record to the ENUM client functionality 135 of the telephony operator A (action 415). The NAPTR record returned to the ENUM client functionality 135 contains the dumb-URI associated with the specified telephone number.

The ENUM client functionality 135, which is assumed to be capable of recognizing that a URI is a dumb-URI and not a true SIP URI, queries the security policy platform 160, particularly the policy enforcer 170, asking for the true SIP URI of the called party corresponding to the dumb-URI (action 420). When contacting the policy enforcer 170, the ENUM client functionality 135 provides to the policy enforcer 170 its credentials, for example using a mutual authentication mechanism of the type provided by the TLS (Transport Layer Security) protocol based on digital certificates defined in the IETF RFC 2246 document (or other similar security mechanism, like for example the IPSec mechanism defined in the IETF RFC 2401 document). The credentials that the ENUM client functionality 135 provides to the policy enforcer 170 may include information about the identity of the calling party (e.g., the telephone number thereof), i.e. of the subscriber 105; this information may be necessary for the processing of the request by the policy enforcer 170.

The policy enforcer 170 processes the request from the ENUM client functionality 135 and, using the dumb-URI received from the ENUM client functionality 135 as a key for searching among the security policies it stores, fetches the security policy rules associated with that dumb-URI (action 425).

Then, the policy enforcer 170 processes the security policy rules associated with the specified dumb-URI (action 430). Depending on the results of the security policy rules processing, the policy enforcer 170 returns an answer to the ENUM client functionality 135. If, as in the example herein considered, the policy enforcer 170 assesses that the calling party, i.e. the subscriber 105, is entitled to resolve the dumb-URI so as to retrieve the IP address of the called party, i.e. the subscriber 115, the policy enforcer 170 returns to the ENUM client functionality 135 the SIP URI of the called party (action 435); if, on the contrary, the processing of the security policy rules gives as a result that the calling party is not entitled to retrieve the real SIP URI (trough which it could resolve the IP address) of the called party, the dumb-URI is not resolved, and a negative response is sent back to the ENUM client functionality 135. The security policy rules may also define specific behaviours in those cases where the called user is not "present", i.e. its communications terminal has not registered to the registrar SIP server; for example, the security policy rules may prescribe that in case the called user is not "present", i.e. he/she cannot be contacted at the moment, the request of the caller is simply discarded, or they may prescribed that if the caller is entitled to resolve the dumb-URI, but the called user is not "present", i.e. he/she cannot be contacted at the moment, a courtesy information message is sent to the caller.

For an increased security, the policy manager 165 can generate a new dumb-URI for that telephone number, and store the new dumb-URI in the proper ENUM database in substitution of the former one.

The ENUM client functionality 135 receives the SIP URI of the called party (action 440), then it uses the retrieved SIP URI to query the DNS system 215 for finding the IP address of the called party, i.e. of the subscriber 115, or of the network 110 (e.g., of a call server) of the telephony operator B of the called subscriber 115 (action 445).

The DNS system 215 locates the searched IP address, using the SIP URI (action 450) and returns the IP address of the (call server of the) network 110 of the telephony operator B of the called subscriber 115 to a call server in the network apparatuses 120 of the telephony operator A (action 455).

The call server in the network apparatuses 120 of the telephony operator A uses the retrieved IP address to attempt establishing a call with the called party (subscriber 115). In particular, assuming that SIP is used as signalling protocol between the telephony networks 100 and 110, the call server in the network apparatuses 120 of the telephony operator A may send a SIP INVITE message (a standard message allowing to set up a telephone call) which contains the SIP URI for the customer "B"; the call server in the network apparatuses 125 of the telephony operator B resolves the SIP URI of the called subscriber 115 into a local (i.e., internal to the network 110) IP address of the called subscriber 115 (e.g., a dynamic IP address assigned by the telephony operator B to a communication terminal, e.g. a VoIP phone, or a personal computer, of the called subscriber 115) and the conversation between the subscribers 105 and 115 can go through by means of the network infrastructures of the telephony operators A and B.

It is pointed out that the procedure described above applies as well in case the subscribers 105 and 115 belong to the same network (e.g. Network A, in which case the network apparatuses 120 and 125 and the Tier-2 databases 150-1 and 150-2 coincide); in such a case, the resolution of the TEL URI of the called subscriber 115 is simplified, since only the ENUM Tier-2 database 150-1 is involved.

Figure 5:
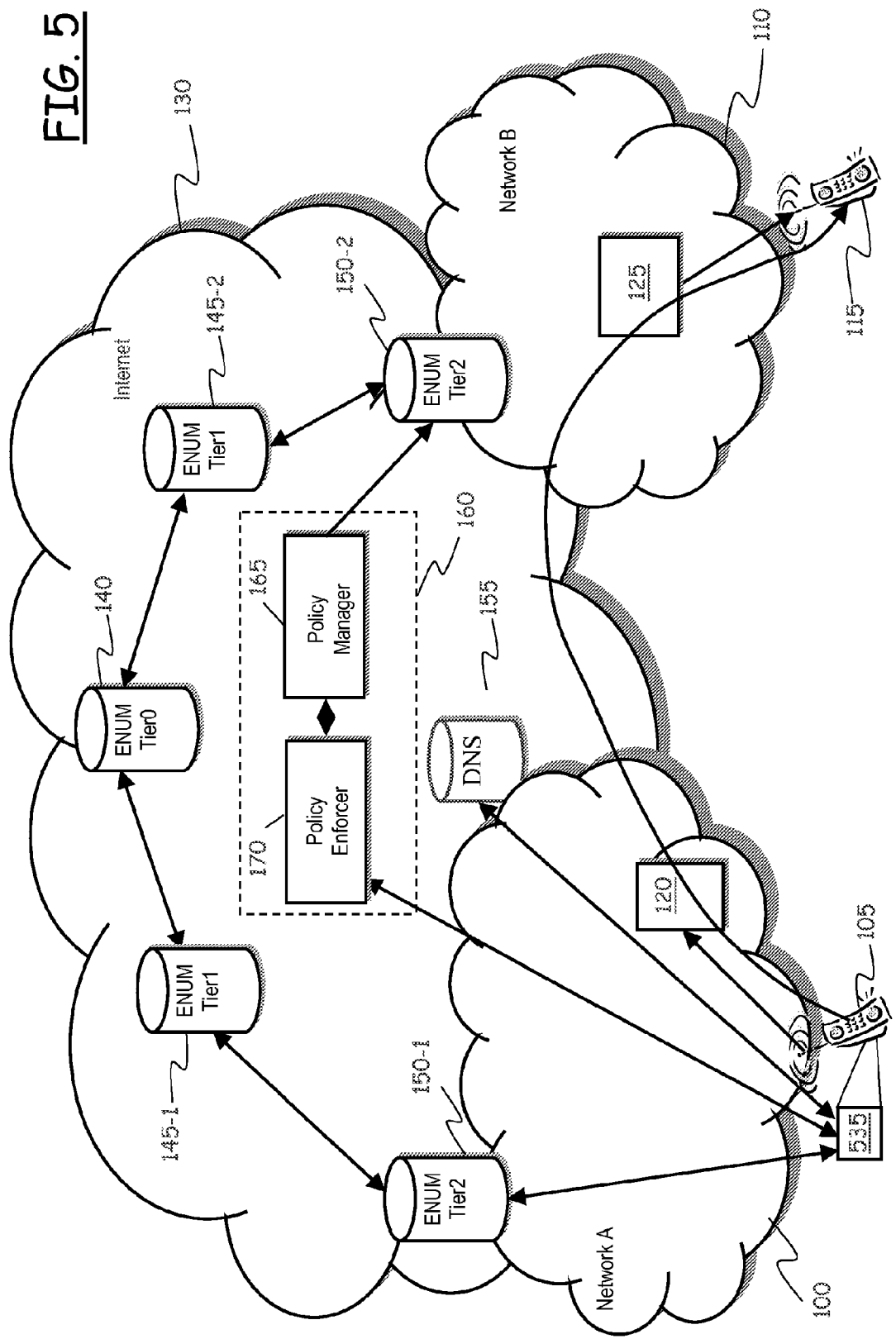
FIG. 5 schematically shows another scenario of application of an embodiment of the present invention.

In FIG. 5, another possible scenario of application of an embodiment of the present invention is schematically shown. Same reference numerals are used to denote elements that are identical or similar to those shown in FIG. 1.

In this other scenario, it is assumed that subscriber 105, being the calling party in the considered example, has an Internet-enabled phone, like a VoIP phone, with an ENUM client functionality 535 adapted to perform the actions that, in the scenario of FIG. 1, were instead performed by the ENUM client functionality 135 of the network apparatuses 120 of the telephony operator A.

Figure 6A:
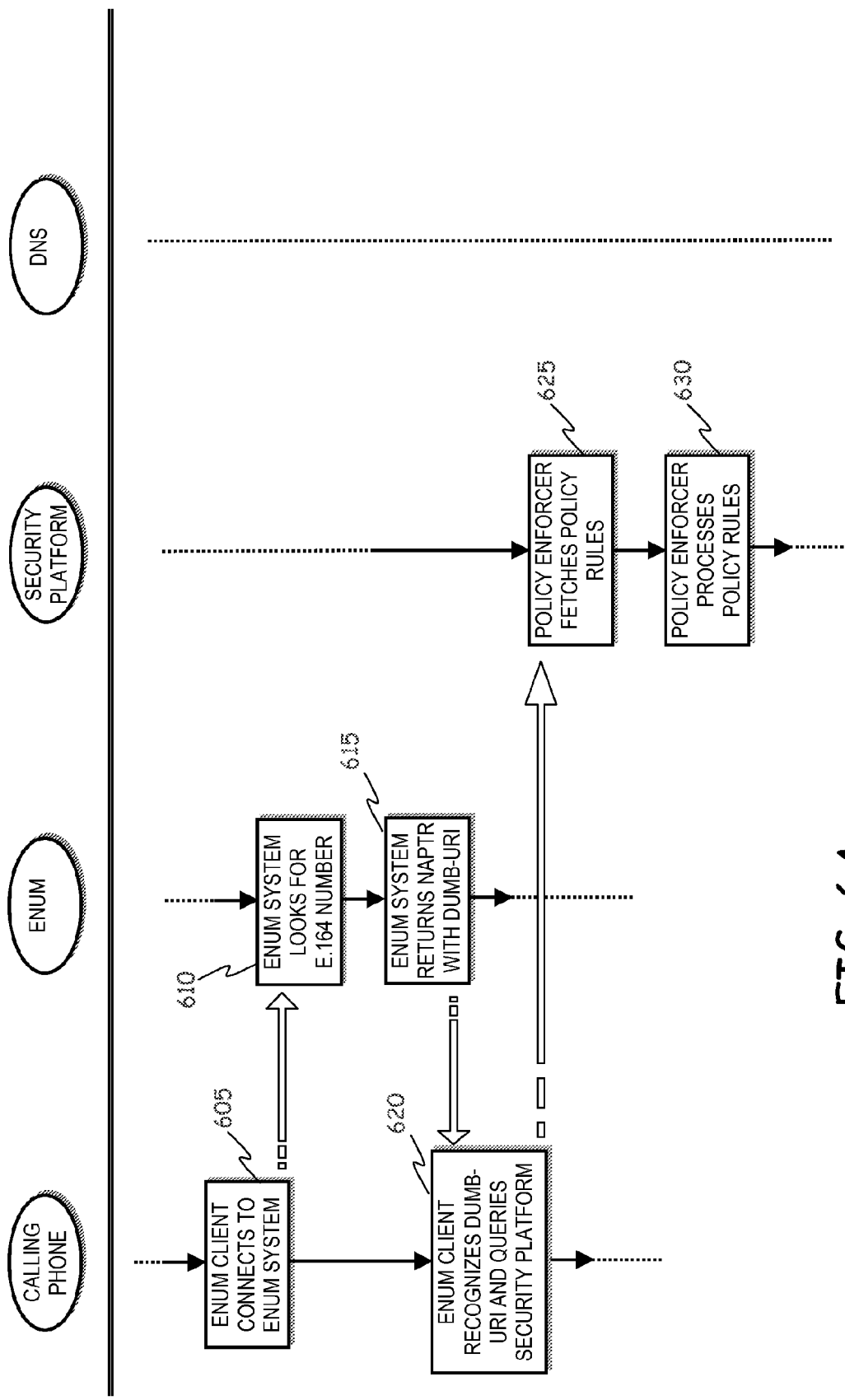
FIGS. 6A and 6B show a schematic flowchart of a security policy enforcement phase, according to another embodiment of the present invention.
Figure 6B:
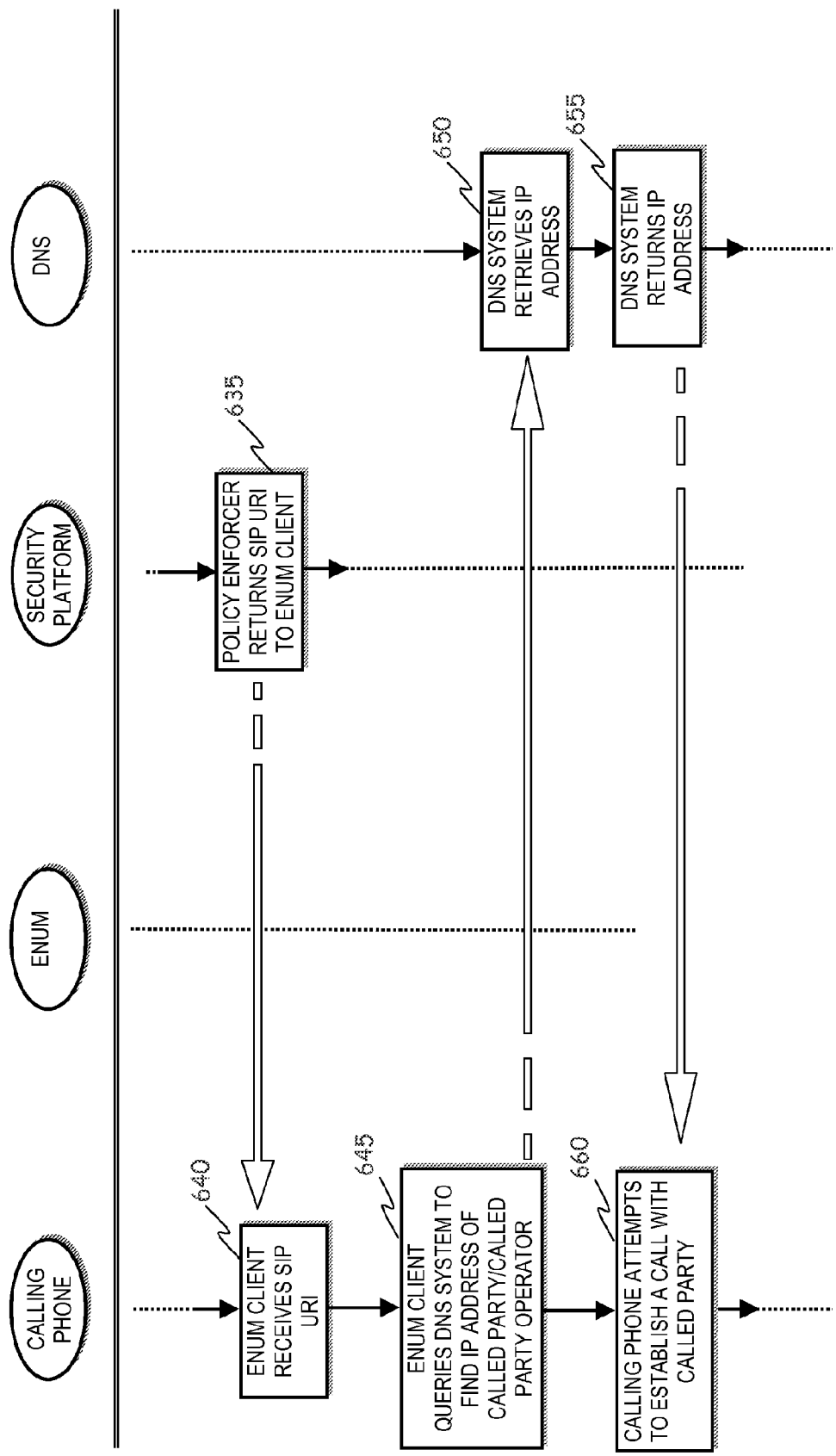

The schematic flowchart of FIGS. 6A and 6B shows the main actions performed by the security policy platform according to an embodiment of the present invention, when someone, like for example the subscriber 105 of the telephony operator A in FIG. 5, tries to reach the subscriber 115 of the telephony operator B through the Internet. It is assumed that the subscriber 115 (or his/her telephony operator B) has registered to the security policy platform 160 and has defined his/her security policy rules.

The subscriber 105 dials as usual the telephone number of the called subscriber 115, complete of country code and area code.

The ENUM client functionality 535 of the phone of the subscriber 105 contacts the ENUM system 215, providing thereto the E.164 telephone number of the called subscriber (action 605).

The ENUM system 215 looks through its databases searching for the specified E.164 number (action 610). In particular, in the example of FIG. 1, the ENUM golden tree, i.e. the hierarchic structure of databases is climbed up from the Tier 2 database 150-1 to the Tier 0 database 140, and then down to the Tier 2 database 150-2.

The ENUM database 150-2 that stores the NAPTR record for the searched E.164 number provides the found NAPTR record to the ENUM client functionality 535 of the phone of the subscriber 105 (action 615). The NAPTR record returned to the ENUM client functionality 535 contains the dumb-URI associated with the specified telephone number.

The ENUM client functionality 535, which is assumed to be capable of recognizing that a URI is a dumb-URI, queries the security policy platform 160, particularly the policy enforcer 170, asking for the true SIP-URI of the called party corresponding to the dumb-URI (action 620). When contacting the policy enforcer 170, the ENUM client functionality 535 provides to the policy enforcer 170 its credentials, for example using a mutual authentication mechanism of the type provided by the TLS (Transport Layer Security) protocol based on digital certificates defined in the IETF RFC 2246 document (or other similar security mechanism, like for example the IPSec mechanism defined in the IETF RFC 2401 document). The credentials that the ENUM client functionality 535 provides to the policy enforcer 170 may include information about the identity of the calling party (e.g., the telephone number thereof), i.e. of the subscriber 105; this information may be necessary for the processing of the request by the policy enforcer 170.

The policy enforcer 170 processes the request from the ENUM client functionality 535 and, using the dumb-URI as a key, fetches the security policy rules associated therewith (action 625).

Then, the policy enforcer 170 processes the security policy rules associated with the specified dumb-URI (action 630). Depending on the results of the security policy rules processing, the policy enforcer 170 sends an answer to the ENUM client functionality 535. If, as in the example herein considered, the policy enforcer 170 assesses that the calling party, i.e. the subscriber 105, is entitled to resolve the dumb-URI so as to retrieve the SIP URI (through which it could resolve the IP address) of the called party, i.e. the subscriber 115, the policy enforcer 170 returns to the ENUM client functionality 535 the SIP URI of the called party (action 635); if, on the contrary, the processing of the security policy rules gives as a result that the calling party is not entitled to retrieve the SIP URI of the called party, the dumb-URI is not resolved, and a negative response is sent back to the ENUM client functionality 535.

The ENUM client functionality 535 receives the SIP URI of the called party (action 640), then it queries the DNS system 215 for finding the IP address of called party, i.e. of the subscriber 115, or of the network 110 of the telephony operator B of the called subscriber 115 (action 645).

The DNS system 215 locates the searched IP address, using the SIP URI (action 650) and returns the IP address of called party, i.e. of the subscriber 115, or of the network 110 of the telephony operator B of the called subscriber 115 to the phone of the subscriber 105 (action 655).

The phone of the subscriber 105 uses the retrieved IP address to attempt establishing a call with the called party (subscriber 115). In particular, the phone of the subscriber 105 may send a SIP INVITE message which contains the SIP URI for the customer "B" to the phone of the subscriber 115, or to a call server in the network apparatuses 125 of the telephony operator B; the call server in the network apparatuses 125 of the telephony operator B resolves the SIP URI of the called subscriber 115 into a local (i.e., internal to the network 110) IP address of the called subscriber 115 (e.g., a dynamic IP address assigned by the telephony operator B to a communication terminal, e.g. a VoIP phone, or a personal computer, of the called subscriber 115) and the conversation between the subscribers 105 and 115 can go through.

As in the previously described scenario, the procedure just described applies as well in case the subscribers 105 and 115 belong to the same network (e.g. Network A, in which case the network apparatuses 120 and 125 and the Tier-2 databases 150-1 and 150-2 coincide); in such a case, the resolution of the TEL URI of the called subscriber 115 is simplified, since only the ENUM Tier-2 database 150-1 is involved.

In order to further increase the degree of security, the security policy platform 160 may generate a new dumb-URI (and communicate it to the other entities) every time a dumb-URI is resolved and the corresponding SIP-URI retrieved; in this way, it is ensured that the information about a SIP URI obtained once by resolving a corresponding dumb-URI may be reused, possibly by undesired subjects, afterwards.

From the above description of some exemplary embodiments thereof, it can be appreciated that the present invention allows making the ENUM services more secure by keeping hidden the information for contacting end users, and subjecting the retrieval of said contact information to the satisfaction of security rules that may be defined by the end users or by their telephony operators. The retrieval of the contact information necessary for contacting someone over the internet starting from his/her usual telephone number can thus be allowed only to selected users/classes of users, who are considered "trusted", and this allows for example avoiding spamming and, in general, calls from undesired persons/entities.

The security policy platform can be implemented by means of one or more servers connected to the Internet, and offer services to telephony operators.

The present invention has been here disclosed making reference to some exemplary embodiments thereof, however those skilled in the art will readily recognize that modifications to the described embodiments are possible, as well as other embodiments, without departing from the scope of the appended claims.

For example, the actions of generating a dumb-URI to be associated with a telephone number and communicating to the ENUM system the telephone number and the dumb-URI may be performed only the first time a user subscribes to the security policy platform, as described in the foregoing, or periodically, or any time someone tries to contact the subscriber assignee of that telephone number.

More generally, the present invention can apply to systems other than ENUM, where however a database intended to store users' contact information is provided.

The invention claimed is:

1. A method of providing telecommunication services, comprising:
    generating fictitious contact information univocally associated with a telephone number assigned to a subscriber;
    storing the fictitious contact information in a database;
    receiving, from a requester, a request for contact information corresponding to said telephone number, wherein the contact information is configured to allow the requester to contact, via the Internet, the subscriber assigned said telephone number;
    in response to receiving the request, providing, from the database, said fictitious contact information to the requester;
    receiving, from the requester, said fictitious contact information;
    based on the received fictitious contact information, determining whether properties of at least one of said requester and said request satisfy at least one security rule; and
    if properties of at least one of said requester and said request satisfy said at least one security rule, providing the contact information to the requester.

2. The method of claim 1, wherein said database is an ENUM database.

3. The method of claim 1, wherein said contact information includes a SIP URI univocally identifying said subscriber.

4. The method of claim 3, wherein said fictitious contact information includes a fictitious URI univocally associated with the SIP URI of said subscriber.

5. The method of claim 4, wherein said fictitious URI includes randomly-generated information.

6. The method of claim 5, wherein said fictitious URI includes a domain name univocally identifying a resolver system adapted to use the fictitious contact information to provide said contact information to the requester if properties of at least one of said requester and said request satisfy the at least one security rule.

7. The method of claim 1, wherein said at least one security rule defines one or more among: telephony network operators entitled to receive the contact information, requesters entitled to receive the contact information, types of connectivity services the requester is entitled to exploit for contacting over the Internet the subscriber assigned said telephone number, and dates and times when requesters are allowed to contact the subscriber assigned said telephone number.

8. The method of claim 1, comprising:
enabling one or more of the subscriber assigned the telephone number and a telephony operator to which the subscriber has subscribed to define said at least one security rule.

9. The method of claim 1, comprising:
in response to determining that properties of at least one of said requester and said request satisfy said at least one security rule, replacing the fictitious contact information univocally associated with the telephone number assigned to the subscriber with new fictitious information.

10. A system for providing telecommunication services, comprising:
one or more processors; and
memory storing computer-readable instructions that, when executed by the one or more processors, cause the system to:
generate fictitious contact information univocally associated with a telephone number assigned to a subscriber, and to cause the fictitious contact information to be stored in a database;
receive, from a requester, a request for contact information corresponding to said telephone number, wherein the contact information is configured to allow the requester to contact, via the Internet, the subscriber assigned said telephone number; and
in response to receiving the request, provide, from the database, said fictitious contact information to the requester;
receiving, from the requester, said fictitious contact information;
based on the received fictitious contact information, determining whether properties of at least one of said requester and said request satisfy at least one security rule; and
if properties of at least one of said requester and said request satisfy said at least one security rule, providing the contact information to the requester.

11. The system of claim 10, wherein said database is an ENUM database.

12. The system of claim 10, wherein said contact information includes a SIP URI univocally identifying said subscriber.

13. The system of claim 12, wherein said fictitious contact information includes a fictitious URI univocally associated with the SIP URI of said subscriber.

14. The system of claim 13, wherein said fictitious URI includes randomly-generated information.

15. The system of claim 14, wherein said fictitious URI includes a domain name univocally identifying a security policy rules processor.

16. The system of claim 10, wherein said at least one security rule defines one or more among: telephony operators entitled to receive the contact information, requesters entitled to receive the contact information, types of connectivity services the requester is entitled to exploit for contacting over the Internet the subscriber assigned said telephone number, and dates and times when requesters are allowed to contact the subscriber assigned said telephone number.

17. The system of claim 16, wherein said at least one security rule is in XML language.

18. The system of claim 10, wherein the memory stores computer-readable instructions that, when executed by the one or more processors, cause the system to:
allow one or more of the subscriber assigned the telephone number and a telephony operator to which the subscribed has subscribed to define said at least one security rule.

19. The system of claim 10, wherein the memory stores computer-readable instructions that, when executed by the one or more processors, cause the system to:
in response to determining that properties of at least one of said requester and said request satisfy said at least one security rule, replace the fictitious contact information univocally associated with the telephone number assigned to the subscriber with new fictitious contact information.

* * * * *

UNITED STATES PATENT AND TRADEMARK OFFICE
CERTIFICATE OF CORRECTION

Page 1 of 1

PATENT NO. : 8,510,793 B2
APPLICATION NO. : 12/745608
DATED : August 13, 2013
INVENTOR(S) : De Lutiis et al.

It is certified that error appears in the above-identified patent and that said Letters Patent is hereby corrected as shown below:

On the title page, Item [22]

Please delete "Filed: Oct. 5, 2010" and insert --PCT Filed: Nov. 30, 2007--.

On the title page, Item [86]

Please insert --PCT No.: PCT/EP2007/063081--.
    Please insert --§ 371 (c)(1), (2), (4) Date: Oct. 5, 2010--.

On the title page, Item [87]

Please insert --PCT Pub. No.: WO2009/068111--.
    Please insert --PCT Pub. Date: Jun. 4, 2009--.

Signed and Sealed this
Fourth Day of February, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,510,793 B2
APPLICATION NO. : 12/745608
DATED : August 13, 2013
INVENTOR(S) : De Lutiis et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 515 days.

Signed and Sealed this

Fifteenth Day of September, 2015

Michelle K. Lee
*Director of the United States Patent and Trademark Office*